(12) United States Patent
Nakatani (10) Patent No.: US 6,391,216 B1
(45) Date of Patent: May 21, 2002

(54) METHOD FOR REACTIVE ION ETCHING AND APPARATUS THEREFOR

(75) Inventor: Isao Nakatani, Ibaraki (JP)

(73) Assignees: National Research Institute for Metals, Ibaraki; Japan Science and Technology Corporation, Saitama, both of (JP)

( * ) Notice: Subject to any disclaimer, the term of this patent is extended or adjusted under 35 U.S.C. 154(b) by 0 days.

(21) Appl. No.: 09/157,421

(22) Filed: Sep. 21, 1998

(30) Foreign Application Priority Data

Sep. 22, 1997 (JP) ........................................ 2001-256635
Sep. 22, 1997 (JP) ........................................ 2001-256636

(51) Int. Cl.$^7$ ............................. C23F 1/00; H01L 21/00
(52) U.S. Cl. ............................. 216/41; 216/51; 216/67; 216/74; 216/66; 438/712
(58) Field of Search .............................. 216/74, 66, 67, 216/41, 37, 47, 75, 51, 22; 438/572, 712

(56) References Cited

U.S. PATENT DOCUMENTS 5,176,792 A * 1/1993 Fullowan et al. ........... 438/572

* cited by examiner

Primary Examiner—Gregory Mills
Assistant Examiner—P. Hassanzadeh
(74) Attorney, Agent, or Firm—Wenderoth, Lind & Ponack, L.L.P.

(57) ABSTRACT

The invention provides a method for reactive-ion etching a magnetic material with a plasma of a mixed gas of carbon monoxide and a nitrogen-containing compound, the method comprising a step, in which a multilayered film comprising a magnetic material thin film having thereon a resist film formed on a substrate is exposed to an electron beam and then developed, to form a pattern on the resist film, a step, in which a mask material is vacuum deposited, a step, in which the resist is dissolved, to form a mask, and a step, in which a part of the magnetic material thin film that is not covered with the mask is removed by reactive ion etching with a plasma of a mixed gas of carbon monoxide and a nitrogen-containing compound, to form a pattern on the magnetic material thin film, and thus obtaining the magnetic material thin film finely worked.

2 Claims, 6 Drawing Sheets

Fig. 1a
Start

Fig. 1b
Formation of resist pattern

Exposure to electron beam and development treatment

Fig. 1c
Vacuum deposition of mask material

Vacuum deposition of mask material (Ti)

Fig. 1d
Formation of mask

Lift off

Fig. 1e
Transfer to magnetic material thin film

Etching with CO-NH₃ plasma

Fig. 1f
Removal of titanium film

Etching with CCl₄ plasma

*Fig. 2a*
PRIOR ART
Start

Exposure to electron beam and development treatment

*Fig. 2b*
PRIOR ART
Formation of resist pattern

Etching with oxygen plasma

*Fig. 2c*
PRIOR ART

Etching with $CF_4$ plasma

*Fig. 2d*
PRIOR ART
Transfer to quartz ($SiO_2$) thin film

Etching with $CO-NH_3$ plasma

*Fig. 2e*
PRIOR ART

Etching with $CCl_4$ plasma

*Fig. 2f*
PRIOR ART
Removal of quartz ($SiO_2$) thin film

METHOD FOR REACTIVE ION ETCHING AND APPARATUS THEREFOR

FIELD OF THE INVENTON

The present invention relates to a mask for reactive ion etching and an apparatus used therefor More specifically, the invention relates to a novel mask for reactive ion etching and an apparatus used therefor, which is characterized by a dry etching apparatus for a magnetic material, which is useful for production of a magnetic head for read-write of a magnetic disk, a microtransformer or a microinductor installed in a magnetic integrated circuit, a magnetic sensor, various quantum magnetic devices, such as a spin scattering magnetoresistance effect device, a spin valve device, a ferromagnetic tunneling device, a spin diode and a spin transistor, and a constitutional part of a micromachine, such as a thin film magnet and a magnetostrictive actuator.

BACKGROUND OF THE INVENTION

A microsemiconductor devices such as a VLSI and a micromagnatic device, are generally produced by a combination of two processes, i.e., a lithography technique and an etching technique.

The lithograph technique is a technique of producing fine patterns on a photosensitive film such as a resist film coated on a surface of a material to be processed, such as a thin film of a semiconductor and a thin film of a magnetic material, which includes a photolithography technique where exposure is conducted with an ultraviolet ray, an electron beam lithography technique where exposure is conducted with an electron beam, and an ion beam lithography technique where exposure is conducted with an ion beam.

The etching technique is a technique of producing a device by transferring the resist pattern produced by the lithography to the material to be processed, such as a thin film of a semiconductor and a thin film of a magnetic material.

The etching technique includes a wet etching method, an argon ion milling method and a reactive ion etching method. Among these etching methods, the reactive ion etching method is the best method because the pattern produced by the lithography can be transferred in the most precise manner, it is most suitable for fine working, and the etching rate is the largest. LSIs of semiconductors and semiconductor memory devices are actually produced by this method.

In the reactive ion etching method, a material to be processed is placed in a plasma of a reactive gas with applying an electric field, and atoms on the surface of the material to be processed are chemically and physically removed by an ion beam incident normally onto the surface of the material to be processed, by which an anisotropic working is possible, where a part not covered with the mask is vertically cut along the edge of the mask. Accordingly, a fine and sharp feature can be transferred by the reactive ion etching method. In the reactive ion etching method, chemical active species such as an ion and a radical of the reactive gas generated in the plasma are adsorbed on the surface of the material to be processed, to chemically react with the material to be processed, and a surface reactive layer having a lower bond energy. The surface of the material to be processed is exposed to the impact of cations accelerated by the electric field in the plasma, and thus the surface reactive layer having a lower bond energy is removed by the sputtering effect by ions or the evaporation effect of itself. That is, the reactive ion etching method is a process, which proceeds with a chemical action and a physical action simultaneously. As a result, the selectivity of etching only a specific material, and the anisotropy of vertically etching the surface of the material to be processed can be realized.

However, an effective reactive ion etching method has not been developed for a magnetic material. The wet etching method or the argon ion milling is actually used for a magnetic material, to produce a thin film magnetic head, a magnetic sensor and a microtransformer.

Under the circumstances with respect to a magnetic material, the tendencies of the miniaturization and the high density integration of a magnetic material is considerably delayed, which becomes a difficulty of development of these devices.

The reason why the reactive ion etching of a magnetic material is difficult is as follows. While the magnetic material mainly composed of a transition metal element can react with most of etching gases having been developed for etching semiconductor materials (e.g., $CF_4$, $CCl_4$, $CCl_2F_2$, $CClF_3$, $CBrF_3$, $Cl_2$, $C_2F_6$, $C_3F_8$, $C_4F_{10}$, $CHF_3$, $C_2H_2$, $SF_6$, $SiF_4$, $BCl_3$, $PCl_3$, $SiCl_4$, HCl and $CHClF_2$), only a reaction product having a far larger bond energy than the reaction product of the semiconductor material is produced. Therefore, it cannot be removed by the sputtering or the evaporation, and etching cannot proceed.

Under the circumstances, an investigation of a novel reactive ion etching process has been investigated that is not analogical inference of the existing technique for semiconductors, and recently a method using a plasma of a mixed gas of carbon monoxide (CO) and ammonia gas ($NH_3$) has been developed by the inventor of the invention. The principal of this method is that a carbonyl compound of a transition metal (e.g., $Fe(CO)_5$, $Ni(CO)_4$, $CO_2(CO)_8$, $Mn_2(CO)_{10}$, $Cr(CO)_6$, $V(CO)_6$, $Mo(CO)_6$ and $W(CO)_6$) is formed on the surface of the magnetic material mainly composed of a transition metal element as a material to be processed by an active radial of CO, which is than removed by the evaporation or the sputtering of an ion in vacuum, to proceed etching. The carbonyl compound of a transition metal is the compound having the smallest bond energy among the transition metal compounds. However, since CO is decomposed to $CO_2$ and C through a disproportionation reaction, an introduced CO gas does not contribute to the reaction, and the free C atom reacts with the transition metal element to form a stable transition metal carbide, and therefore an etching reaction does not proceed in general. The $NH_3$ gas plays a role of delaying the disproportionation reaction in the presence of the transition metal element, and the objective reactive ion etching can proceed in the plasma of a gas obtained by mixing the substantially same amounts of CO gas and $NH_3$ gas.

By a method according to this principal, it has been confirmed that magnetic materials, such as a permalloy (Fe—Ni alloy), a Co—Cr alloy and Fe, can be subjected to the reactive ion etching. As a result of the development of such an excellent reactive ion etching method for a magnetic material, further technical development of the method has been expected. However, this method involves a problem in that the etching rate is not so large, for example, 34 nm/min, although working of fine patterns and anisotropic shapes can be realized.

Furthermore, in the conventional etching method using the CO—$NH_3$ mixed gas plasma, an $SiO_2$ film produced by a sputtering method has been used as a mask material that is difficult to suffer the etching reaction, and there is a problem in that the working precision and productivity of the $SiO_2$ film are limited.

FIG. 2 shows a schematic flow diagram of the conventional process.

In step (a) of FIG. 2, on a substrate material such as Corning 7059 glass substrate 1, a ferromagnetic thin film to be processed such as a permalloy (Fe—Ni alloy) 2 is formed by a sputtering method, a quartz ($SiO_2$) thin film 3 as a mask material and a conductive material such as an amorphous carbon film 4 are formed in this order by a sputtering method, and a resist 5 as an electron beam-sensitive film is coated, for example, by a spin coating method. The amorphous carbon film 4 is a conductive layer necessary for not charging the material to be processed on electron beam exposure, which becomes necessary since the quartz ($SiO_2$) film 3 is an insulating material. In step (b) of FIG. 2, a desired pattern is formed on the resist by electron beam writing and development. The amorphous carbon layer is etched by oxygen-ion etching with using the resist pattern as a mask, to expose the $SiO_2$ film along with the pattern (step (c) in FIG. 2). The $SiO_2$ film is then etched with carbon tetrafluoride ($CF_4$), for example, to transfer the pattern onto the $SiO_2$ film. The ion etching with $CF_4$ is effective only to the $SiO_2$ film, and the permalloy as the objective material to be processed is not changed (step (d) of FIG. 2).

Figure 1A:
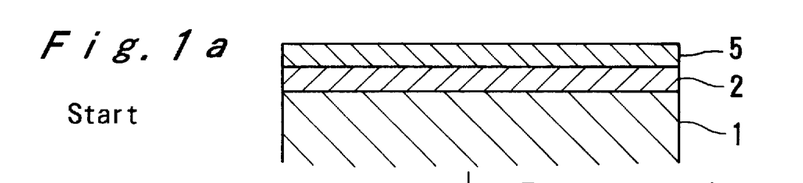
FIGS. 1a–1f are schematic flow diagrams of a fine working of a magnetic material according to one embodiment of the invention.
Figure 1B:
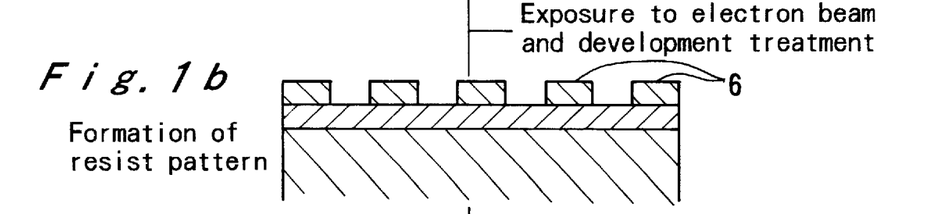
Figure 1C:
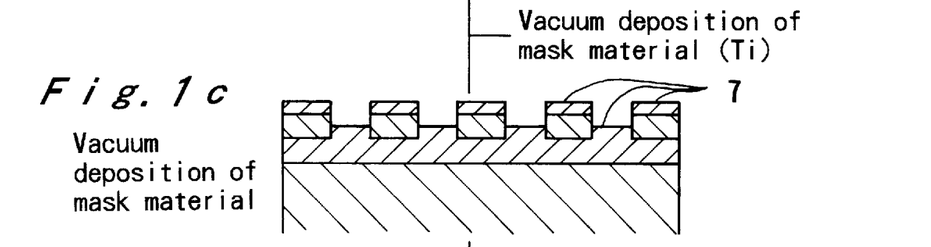
Figure 1D:
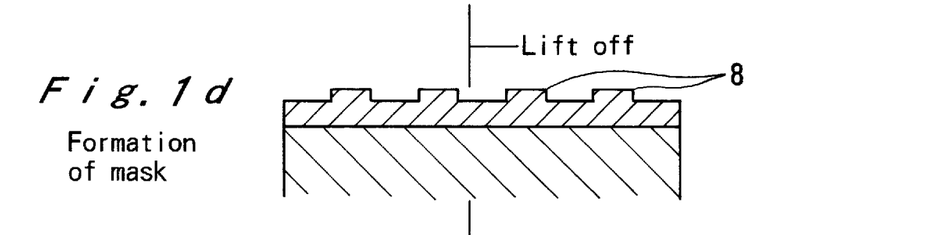
Figure 1E:
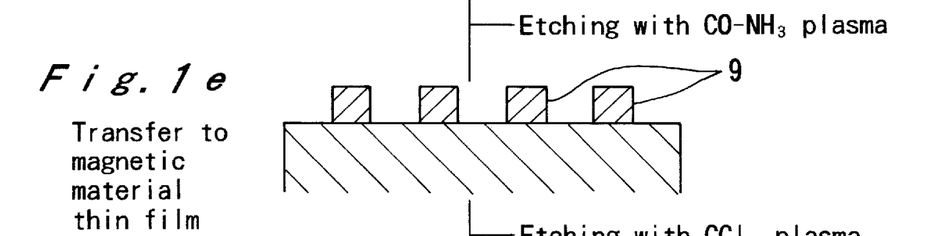
Figure 1F:
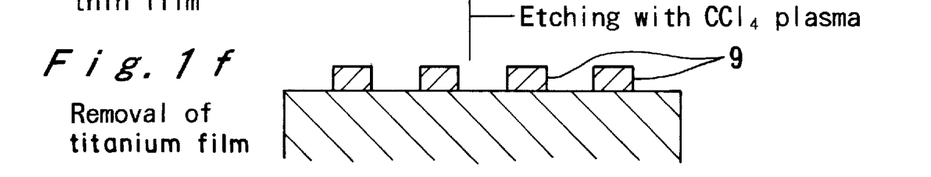
Figure 2A:
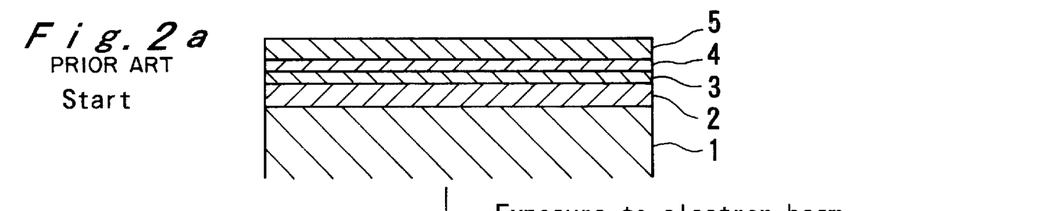
FIGS. 2a–2f are schematic flow diagram of a fine working of a magnetic material according to the conventional process.
Figure 2B:
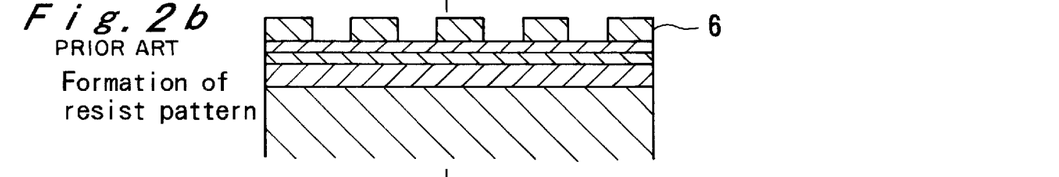
Figure 2C:
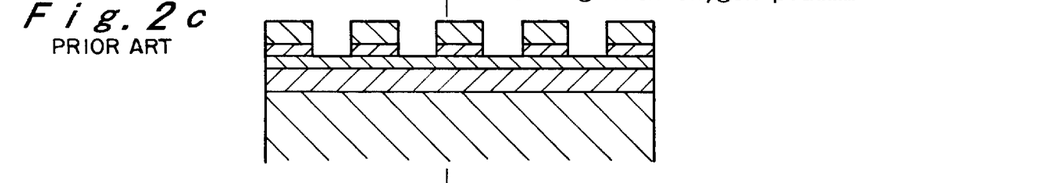
Figure 2D:
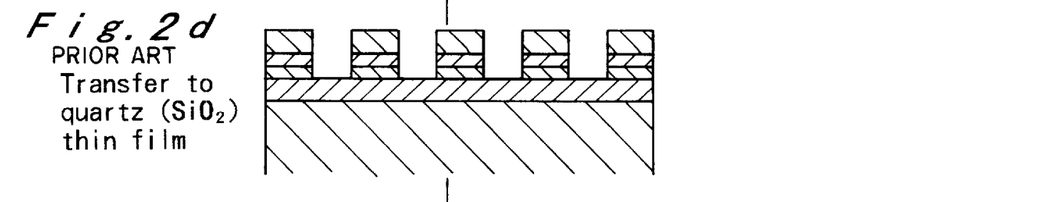
Figure 2E:
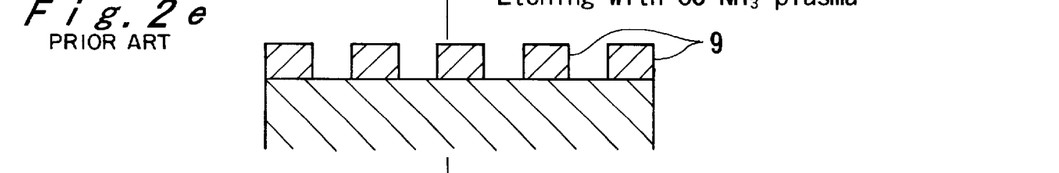
Figure 2F:
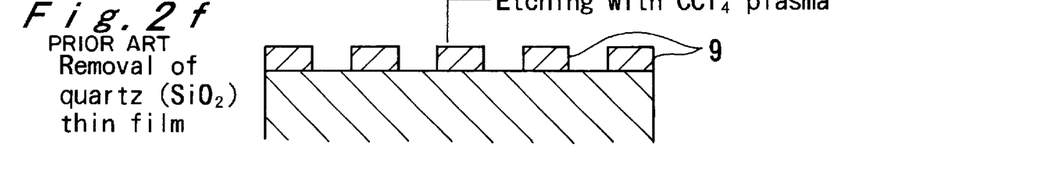

The pattern transferred to the $SiO_2$ film is then transferred onto the permalloy with using the patterned $SiO_2$ as a mask by the reactive ion etching method using the CO—$NH_3$ mixed gas plasma described above. The resist film and the amorphous carbon film are also removed through the reactive-ion etching, and the $SiO_2$ remains on the patterned permalloy, to complete the transfer of the pattern (step (e) of FIG. 2). The fine working with reactive-ion etching of a magnetic material, such as a permalloy (Fe—Ni alloy), a Co—Cr alloy and Fe, has been conducted according to this conventional process.

However, the conventional process involves a problem in that not only the process is complicated with deteriorated productivity, but also since the transfer is twice performed, high precision of a transferred pattern cannot be obtained. In the conventional process, a pattern corresponding to the part that has not been exposed to an electron beam finally remains, and as a result, the inverted pattern of the pattern exposed to an electron beam, i.e., a negative pattern, is provided However, in the course of the production of a complicated and fine structure of a magnetic material, it is also necessary to provide a pattern corresponding to the part that has been exposed to an electron beam, i.e., a positive pattern.

SUMMARY OF THE INVENTION

An object of the invention is to solve the problems associated with the conventional techniques, and to provide a novel mask material, a process technique using the same, and an apparatus therefor that realize effective reactive ion etching of a magnetic material with a large etching rate, etching with ease and a high resolution and precision, and provision of a positive pattern.

The invention relates to a method for reactive ion etching a magnetic material with a plasma of a mixed gas of carbon monoxide and a nitrogen-containing compound, the method comprising a step, in which a multilayered film comprising a magnetic material thin film having thereon a resist film formed on a substrate is exposed to an electron beam and then developed, to form a pattern on the resist film, a step, in which a mask material is vacuum deposited, a step, in which the resist is dissolved, to form a mask, and a step, in which a part of the magnetic material thin film that is not covered with the mask is removed by reactive-ion etching with a plasma of a mixed gas of carbon monoxide and a nitrogen-containing compound, to form a pattern on the magnetic material thin film, and thus obtaining the magnetic material thin film finely worked.

In the method for reactive-ion etching of the invention described above, the mask used in the reactive ion etching may comprise at least one member selected from the group consisting of titanium, magnesium, aluminum, germanium, platinum, palladium, an alloy comprising at least one of them as a main component, and a compound thereof.

In the method for reactive-ion etching of the invention, the mask used in the reactive-ion etching may comprise silicon or an alloy comprising silicon as a main component.

In the method for reactive-ion etching of the invention, the mask used in the reactive ion etching may comprise a compound of silicon, and may be disposed on the pattern formed on the resist film and formed into the mask by a lift-off method.

The invention also relates to an apparatus for reactive ion etching comprising a reaction chamber and metallic parts contained in the reaction chamber, the whole or a part of which comprises at least one metallic material selected from the group consisting of titanium, aluminum, and an alloy comprising at least one of them as a main component.

In the apparatus for reactive ion etching of the invention described above, a surface layer of the whole or a part of the reaction chamber and metallic parts contained in the reaction chamber comprises the at least one metallic material.

In the apparatus for reactive-ion etching of the invention, a susceptor for supporting a material to be etched comprises at least one metallic material described above. In the apparatus for reactive ion etching of the invention, at least one of a highfrequency electrode, a high frequency antenna, an ground electrode, a zero potential shield and a protective plate comprises the at least one metallic material described above.

DESCRIPTION OF THE PREFERRED EMBODIMENTS

The invention relates to a mask for reactive-ion etching used on etching a magnetic material by a reactive-ion etching method using a plasma of a mixed gas of carbon monoxide and a nitrogen-containing compound, and an apparatus for reactive-ion etching.

The invention is described in detail below.

(a) Mask for Reactive Ion-Etching

A mask substance having been generally used in the semiconductor technique is a resist itself, which is a polymer material. However, the various polymer resists cannot be used as a mask in a CO—$NH_3$ gas plasma due to its large loss. Metallic elements, such as Cr, W, Mo, Mn, Nb, Ta, Fe, Ru, Os, Co, Rh, Ir, Ni, Cu, Ag, Au, Ga, In and Sn, and an alloy or compound comprising them as a main component are not suitable as the mask material because they react with the CO—NH gas plasma and themselves are etched by the sputtering action to be worn out. Metallic elements, such as Zn, Cd and Pb, and an alloy or compound comprising them as a main component are also not suitable because they are poor in resistance in vacuum. On the other hand, it has been found from experimental results that Ti, Mg, Al, Si, Ge, Pt, Pd, an alloy comprising at least one of them as a main component, and a compound thereof are suitable as the mask material because they are difficult to react with the CO—$NH_3$ gas plasma. Among these, the most preferred are Ti and an alloy or a compound comprising Ti as a main component in view of the requirements of chemical stability, dense packing of crystalline grains, and difficulty of generation of pinholes.

In the invention, the mask may comprise at least one member selected from the group consisting of Ti, Mg, Al, Ce, Pt, Pd, an alloy comprising at least one of them as a main component, and a compound thereof For example, the mask comprises at least one of a single metal of Ti, Mg, Al, Ge, Pt or Pd, a Ti alloy, a Mg alloy, an Al alloy, a Ge alloy, a Pt alloy, a Pd alloy, a Ti—Mg alloy, a Ti—Al alloy, a Ti—Ge alloy, a Ti—Pt alloy, a Ti—Pd alloy, a Mg—Al alloy, a Mg—Ge alloy, a Mg—Pt alloy, a Mg—Pd alloy, an Al—ce alloy, an Al—Pt alloy, an Al—Pd alloy, a Ge—Pt alloy, a Ge—Pd alloy, a Ti—Mg—Al alloy, a Ti—Al—Ge alloy, a Ti—Mg—Ce alloy, a Ti—Mg—Pt alloy, a Ti—Al—Pd alloy, a Mg—Al—Ge alloy, $TiO_2$, Mgo, $MgF_2$, $Al_2O_3$, TiN, ALN, MgN, $GeO_2$ and PdO. The term "at least one" used heroin means that the whole mask may comprise only one member of them, and the mask may comprise plural kinds of them, which may constitute part by part of the mask, may constitute a laminated structure, or may constitute the exposed surface layer of the mask.

In the invention, the mask may also comprise silicon or an alloy comprising silicon as a main component, as well as a compound of silicon, such as $SiO_2$ and $Si_3N_4$. Preferred example of the alloy of silicon include those comprises silicon and the above-describedmetallic elements, e.g., Ti, Mg, Al and Ce, such as a Ti—Si alloy, a Si—Al alloy, a Si—Ge alloy, a Si—Pt alloy, a Si—Pd alloy, a Ti—Si—Al alloy, a Ti—Mg—Si alloy and an Al—Mg—Si alloy.

While $SiO_2$ has been considered as a material for a mask, it has been used in the method in which the pattern is twice transferred. In the invention, on the other hand, it is used as a novel mask by using the lift-off method.

The mask can be formed by various methods, such as vacuum deposition, sputtering, ion plating or ion-beam deposition.

FIG. 1 shows one embodiment of a schematic flow diagram of the fine working with respect to the mask of the invention.

In step (a) of FIG. 1, a magnetic material thin film 2 as a material to be subjected to the fine working is formed on a substrate material 1 such as Corning 7059 glass, and a resist film 5 is coated thereon, for example, by a spin coating method. The resulting multilayer is exposed to an electron beam, and then developed, to form a desire pattern 6 on the resist film 5 (step (b) of FIG. 1). A mask material 7 such as Ti is vapor deposited (step (c) of FIG. 1), and a Ti mask 8 is formed by a lift-off method, i.e. dissolution of the polymer resist (step (d) of FIG. 1). Apart of the magnetic material thin film that is not covered with the Ti mask is removed by reactive-ion etching with a CO—$NH_3$ mixed gas plasma, to form a pattern on the magnetic material thin film, and thus obtaining the magnetic material thin film 9 finely worked (step (e) of FIG. 1). The Ti mask remains as not removed in this stage. The remaining Ti mask is removed, if necessary, for example, by a conventional reactive etching method using a $CCl_4$i gas plasma (step (f) of FIG. 1).

In any embodiment of the invention, no redeposition layers or a contamination on the surface of the etched feature are observed, and etching with a sharp and a precise shape can be realized. Representative example of the material to be etched in the invention is a magnetic material including a magnetic material comprising a transition metal as a main component, such as permalloy, Fe, Ni, Co, a Co—Cr alloy, a sendust alloy, MO, a rare earth element, an alloy or a compound of these elements.

As the resist film used for forming the mask pattern, various organic polymer film is utilizing the conventional exposure-development system may be used. It may be formed by direct formation of the mask pattern. As the plasma gas for etching, a mixed gas of CO and a nitrogen-containing compound, such as $NH_3$ or an amine, is preferably used for etching a magnetic material.

(b) Apparatus for Reactive Ion Etching

An apparatus for reactive ion etching used in the fine working process of the invention at the step (e) of FIG. 1, i.e. the reactive ion etching using the CO—$NH_3$ mixed gas plasma, is described.

In the conventional apparatus for reactive ion etching the reaction chamber and constitutional parts contained in the reaction chamber are composed of stainless steel. Stainless steel is an alloy comprising iron, nickel and chromium, which are transition metals, and thus has a composition similar to a magnetic material. Therefore, if the reactive ion etching to a magnetic alloy mainly composed of a transition metal with the mixed gas plasma of CO and $NH_3$ is conducted by using the conventional apparatus for reactive-ion etching, not only the material to be etched but also the reaction chamber, an electrode, a susceptor supporting the Material to be etched, and other peripheral parts exposed to the plasma are subjected to the action of the ion etching. Accordingly, a problem arises in that the interior of the reaction vessel is corroded, and at the same time, the whole of the reactive gas plasma cannot be effectively used for etching of the material to be etched. This also becomes a factor of contamination of the material to be etched and brings about various unfavorable results such as reduction in etching rate.

In the invention, to solve the problems described above, titanium (Ti), a Ti alloy, aluminum (Al), an aluminum alloy or a Ti—Al alloy is used for at least a part of the reaction chamber and constitutional parts contained in the reaction chamber instead of stainless steel used in the conventional apparatus.

The term "a part" used herein means, in view of the object of the invention, a portion or a part that is liable to receive the etching action of a plasma of a mixed gas of CO and $NH_3$ or a mixed gas of CO and a nitrogen-containing compound, such as an amine, and adversely affects on the reactive ion etching. Therefore, it can be understood in the practical constitution of the apparatus that the whole or a part of the main body of the reaction chamber, its inner surface, an inlet system and an exhaust system of the gas, and various parts disposed in the chamber are made of the above-described metals, with taking the system of generation and introduction of the plasma and the species and the size of the material to be etched into consideration.

Figure 3:
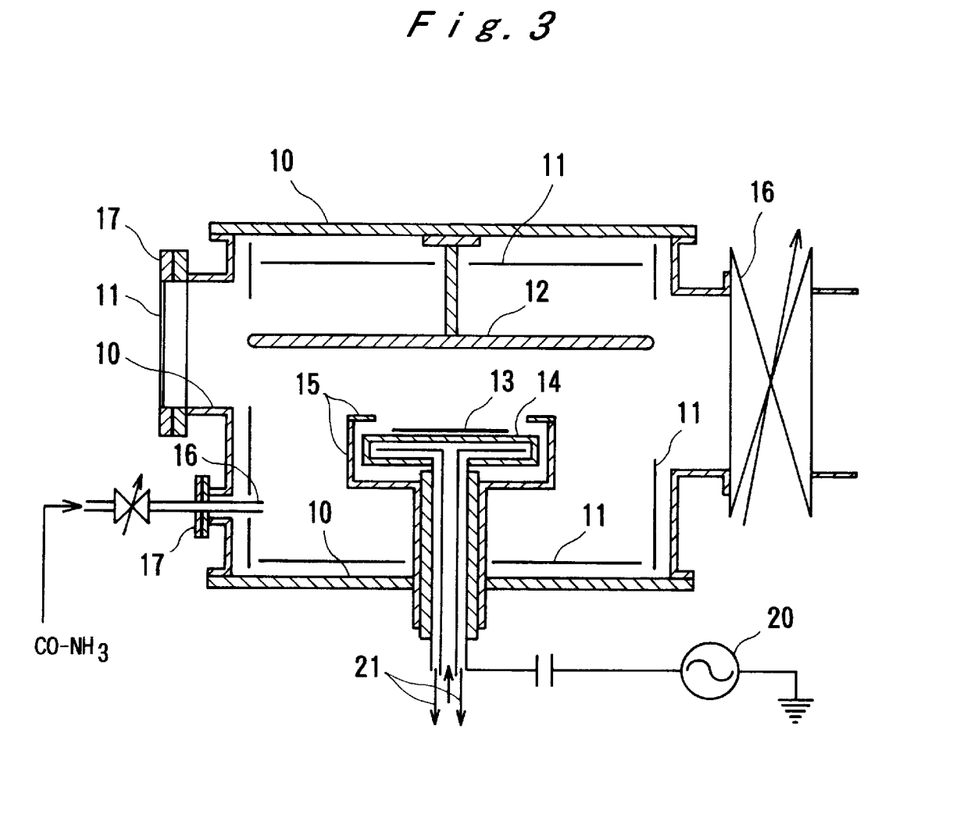
FIG. 3 is a schematic cross sectional view of an apparatus for reactive-ion etching of a parallel flat plates type according to one embodiment of the invention.
Figure 4:
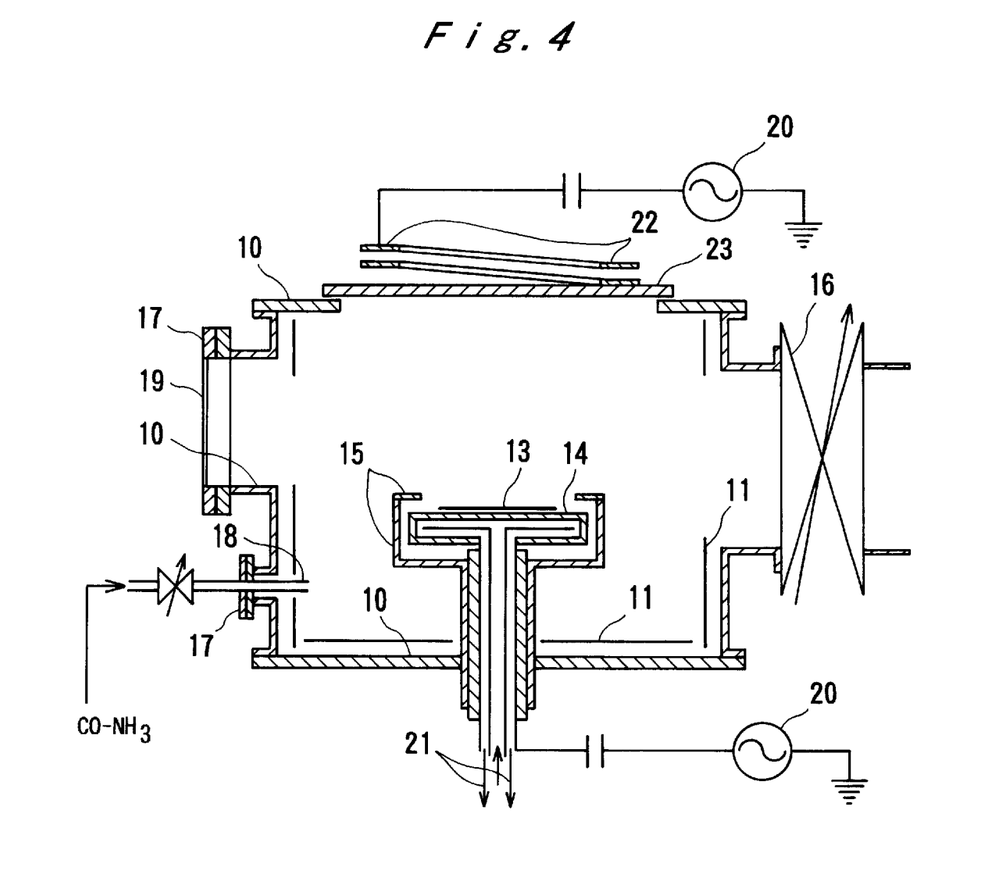
FIG. 4 is a schematic cross sectional view of an apparatus for reactive ion etching of an inductive coupling type according to one embodiment of the invention.
Figure 5:
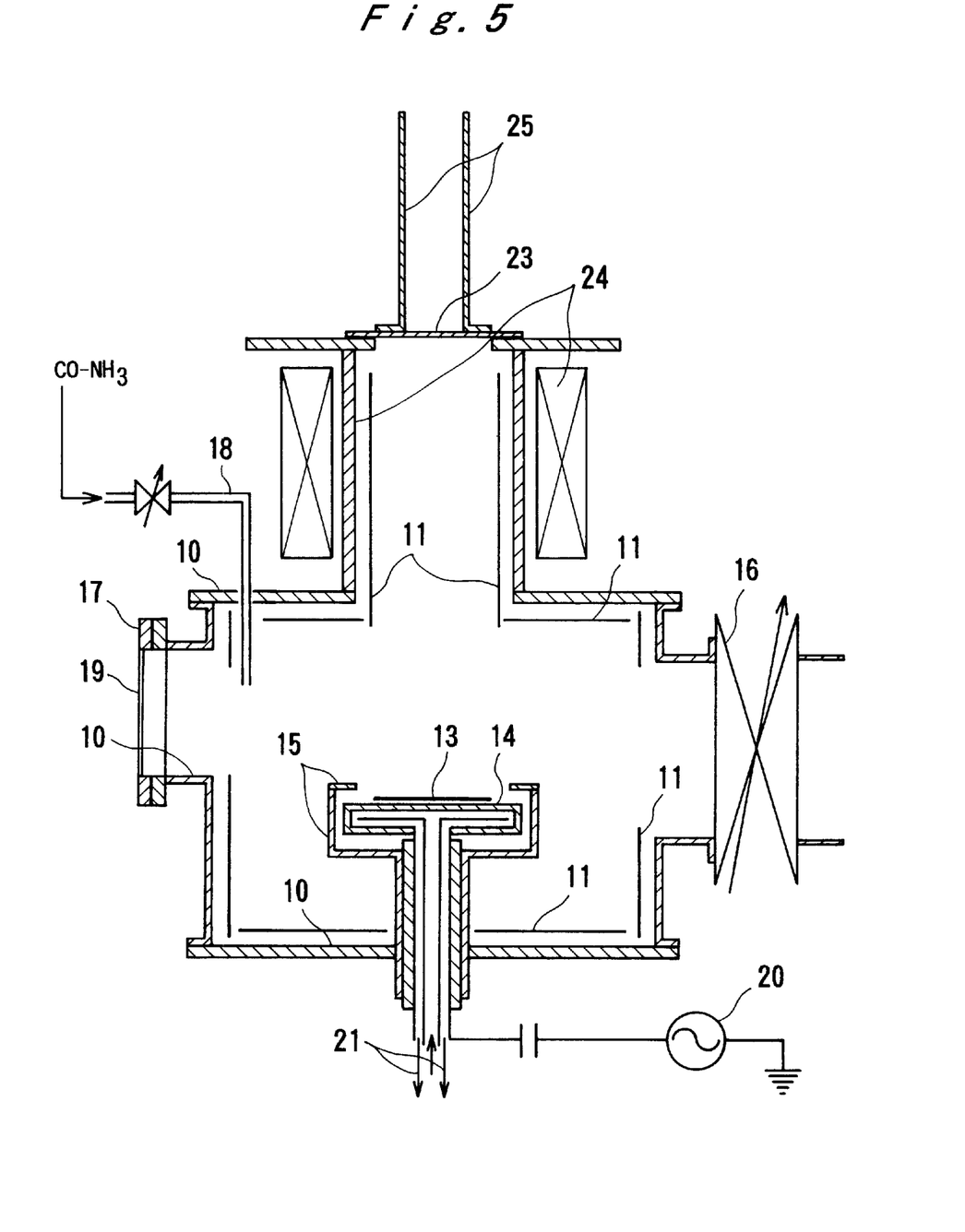
FIG. 5 is a schematic cross sectional view of an apparatus for reactive ion etching of an electron cyclotron resonance type according to one embodiment of the invention.

For example, FIGS. 3, 4 and 5 show embodiments of the apparatus of the invention, which are a parallel flat plates type plasma apparatus, an inductive coupling type plasma E apparatus, and an electron cyclotron resonance type plasma apparatus, respectively. In these apparatuses, the portions and the parts described below are composed of Ti, Al, a Ti alloy, an Al alloy or an Ti—Al alloy, except for a non-metallic part such as glass or cooling water.

In FIGS. 3, 4 and 5, numeral 10 denotes a reaction chamber, 11 denotes a protective plate, 12 denotes a ground electrode, 13 denotes a supporting plate, 14 denotes a high frequency electrode, 15 denotes a zero potential shield, 16 denotes a conductance adjusting valve, 17 denotes a window flange or a feed-through flange, 18 denotes an inlet of a reaction gas, 19 denotes a view port, 20 denotes a high frequency power source, 21 denotes cooling water, 22 denotes a coil antenna, 23 denotes a quartz window, 24 denotes a solenoid coil, and 25 denotes a microwave waveguide.

As a result of actual experiments with respect to Ti, Al, Cu and the conventional stainless steel, in the case where all the metallic parts contained in the reaction chamber, e.g. a susceptor supporting the material to be etched, a high frequency electrode, a zero potential shield, and a ground electrode, as well as struts, shutters, bolts and nuts, were composed of Ti, the most excellent function of the invention was obtained. That is, in the process of reactive ion etching, the ratio of the loss of these parts made of Ti due to corrosion was as small as it cannot be observed in comparison to stainless steel, and the etching rates of a permalloy (80% Ni—Fe alloy) and a 10% Cr—Co alloy as a material to be etched were 120 nm/min and 140 nm/min, respectively, which were 4 times larger than that of the conventional apparatus using stainless steel. Furthermore, no redeposition layers on the surface of the etched feature observed, and etching with a sharp and precise profile could be realized. The parts that exhibit the most considerable influence on the function of the invention are a susceptor supporting the material to be etched, and a ground electrode.

In order to constitute these parts, Ti is preferred from the standpoint of its excellent resistance in vaccum, mechanical strength, weldability and workability of bending and cutting. In addition to pure Ti, various Ti alloys that satisfy the conditions above can be used in the invention. Preferred examples of the Ti alloy include a Ti—Pd alloy, a Ti—Ta alloy, a Ti—Al—Sn alloy, a Ti—Al—V—Mo alloy, a Ti—Al—Sn—Zr—Mo—Si alloy, a Ti—Al—Zr—Mo—Sn alloy, a Ti—Al—V alloy, a Ti—Al—Sn—Zr—Mo alloy, a Ti—Al—V—Sn alloy and a Ti—V—Cr—Al alloy.

While pure Al also exhibit the similar function, it should be carefully handled with respect to the weldability and the strength in comparison to Ti. In addition to pure Al, the same function can be obtained by using alloys, such as an Al—Cu—$X_1$ alloy (where $X_1$ is an additive element, e.g. Si, Mn and Mg), an Al—Mn—$X_2$ alloy (where $X_2$ is an additive element, e.g. Mg and Si), an Al—Mg—$X_3$ alloy (where $X_3$ is Zn, Si, Cr, Mn or Mg), and an Al—Si—$X_4$ alloy (where $X_4$ is an additive element, e.g. Mg, Cu and Cr).

Pure Cu and alloys composed of Cu as a main component do not exhibit any notable function in comparison to stainless steel.

In the invention, according to the constitution described in the foregoing, a novel mask material, a process technique using the mask material, and an apparatus therefor are provided, that realize effective reactive-ion etching of a magnetic material with a large etching rate, etching with ease and high resolution and precision, and provision of an positive pattern. The constitution and function of the invention is described in more detail referring to the following examples, but the invention is not construed as being limited thereto.

EXAMPLE 1

Fine Working of Fe Thin Film Using Ti Mask

Reactive ion etching was conducted according to the process shown in FIG. 1 using the apparatus for reactive ion etching of the invention. In the apparatus, the reaction chamber and all the parts contained therein are made of pure Ti.

An Fe thin film having a thickness of 450 nm was formed as a ferromagnetic material thin film 2 on Corning 7059 glass substrate 1 by a sputtering method. After forming a resist film 5, a pattern 6 of the resist film was formed by electron beam lithography. By using Ti as a mask material 7 formed on the pattern 6, a mask 8 composed or a number of small Ti pads was formed by a lift off method. The resulting sample was placed on a lower electrode cooled by water, powered by a high frequency of 13.56 MHz. The distance between the high frequency electrode and a ground electrode was set to 35 mn. With supplying a CO gas and an $NH_3$ gas into the reaction chamber at flow rates of 6.3 cc/min and 6.8 cc/min, respectively, the pressure of the reaction gas in the chamber was maintained at a pressure of $5.7 \times 10^{-9}$ Torr by evacuating with a turbo-molecular pump. A high frequency of 3.7 W/cm$^2$ was applied to the lower electrode supporting the sample, to generate a glow-discharge plasma of the CO—$NH_3$ mixed gas, and thus reactive-ion etching was conducted. The time of etching process was 4.0 minutes.

After the etching was conducted according to the above-described process, step heights between the part covered with the Ti pad used as the mask 8 and the part not covered with it were measured by a multiple-beam reflection interferometer, to obtain an etching rate. The features formed by etching were observed with an electron-beam microscope, to evaluate the etching for flatness and sharpness of the steps, and a contamination or a redeposition layer. As a result of etching, a patterned Fe thin film was obtained as a finely worked magnetic material 9. The etching rate for the Fe thin film was 90 nm/min. The etching feature having a sharpness with a radius of curvature of about 0.1 μm and a depth of 400 nm was obtained.

Figure 6A:
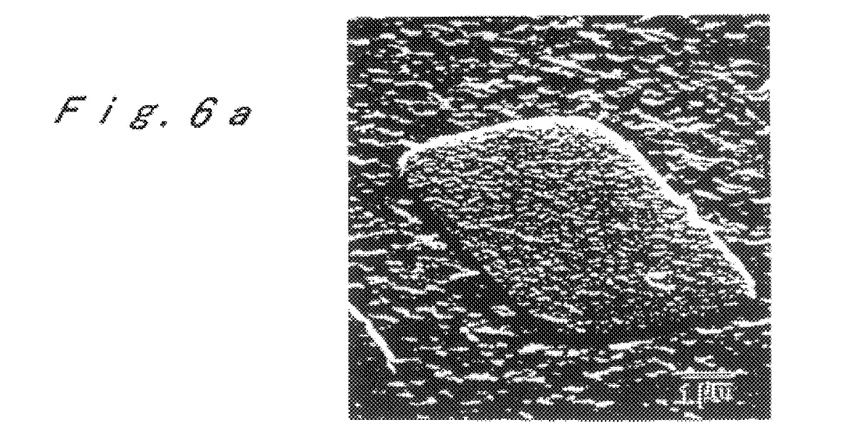
FIGS. 6A, 6B and 6C are electron micrographs showing etch features of magnetic materials.
Figure 6B:
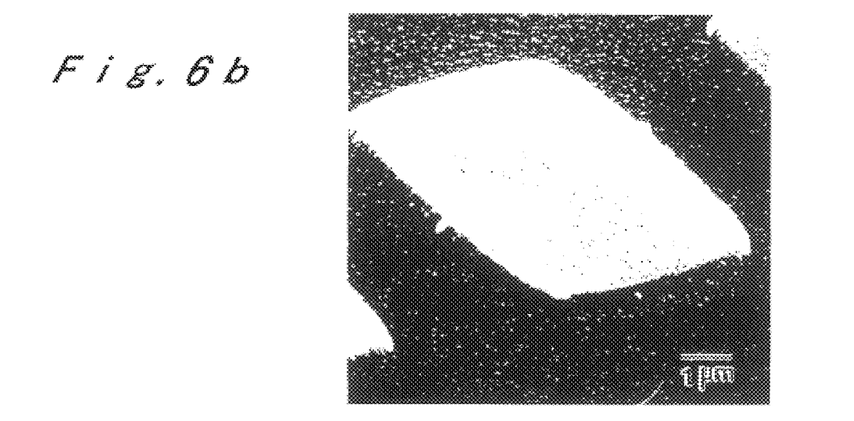
Figure 6C:
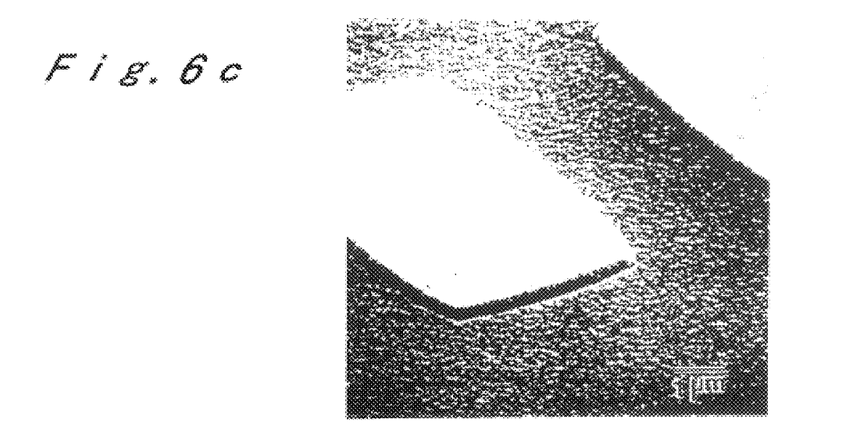

FIGS. 6A, 6B and 6c are electron-beam micrographs showing the results of etching of the following thin films with using the Ti mask.

FIG. 6A: Fe thin film;

FIG. 6B: Co-9.8% Cr thin film;

FIG. 6C: Ni-20% Fe thin film.

It can be understood from the micrographs that excellent working precision can be obtained.

COMPARATIVE EXAMPLE 1

Fine Working of Permalloy (Ni-20% Fe alloy) Thin Film Use in a Ti Mask

The reactive ion etching of an Ni-20% Fe alloy was possible under the same conditions as in Example 1. The etching rate was 120 nm/min and the shape obtained by etching was excellent.

COMPARATIVE EXAMPLE 2

Fine Working of Co-9.8% Cr Alloy Thin Film Using Ti Mask

The reactive ion etching or a Co-9.8% Cr alloy was possible under the same conditions as in Example 1. The etching rate was 140 nm/min and the shape obtained by etching was excellent.

EXAMPLE 2

Fine Working of Ni-20% Fe Alloy Thin Film Using Al Mask

Aluminum was vacuum deposited and an Al mask was formed by a lift off method under the same conditions as in Example 1. The reactive ion etching of a Ni-20% Fe alloy was possible under the same conditions as in Example 1. The etching rate was 120 nm/min and the shape obtained by etching was excellent.

EXAMPLE 3

Fine Working of Co 9.8% Cr Alloy Thin Fi Using Si Mask

Silicon was vacuum deposited and an Si mask was formed by a lift off method under the same conditions as in Example 1. The reactive ion etching of a Co-9.8% Cr alloy was possible under the same conditions as in Example 1. The etching rate was 140 nm/min and the shape obtained by etching was excellent.

EXAMPLE 4

Fine Working of Co-9.8% Cr Alloy Thin Film Using Ge Mask

Germanium was vacuum deposited and a Ge mask was formed by a lift-off method under the same conditions as in Example 1. The reactive-ion etching of a Co-9.8% Cr alloy was possible under the same conditions as in Example 1. The etching rate was 140 nm/min and the shape obtained by etching was excellent.

As described in detail in the foregoing, the reactive ion etching of a magnetic material using a $CO-NH_3$ mixed gas plasma and the like can be more effectively conducted by using the apparatus for reactive-ion etching according to the invention, in comparison to the case using the conventional reactive ion etching apparatus. That is, the etching rate can be increased by about 4 times under the same conditions, to contribute to the working efficiency. Furthermore, the material to be etched is not contaminated during the etching process, and the redeposition layer removed by the etching can be reduced to the level that does not bring about a problem.

According to the function described in the foregoing, the production of a micro magnetic head, a microtrans former, a micro magnetic device, a magnetic sensor, a magnetoresistance device, a spin diode, a spin transistor, a spin valve device, a spin valve magnetic memory and a magnetoresistance tunneling effect device can be possible. The production of a patterned magnetic recording medium of a high density magnetic recording medium that is being developed can also be possible.

What is claimed is:

1. A method for reactive ion etching a magnetic material with a plasma of a mixed gas of carbon monoxide and a nitrogen-containing compound, said method comprising:

exposing a multilayer film comprising a magnetic material thin film on a substrate and a resist film on said magnetic material thin film to an electron beam and then developing to form a pattern on said resist film;

vacuum depositing a mask material;

dissolving the resist to form a mask;

removing the part of the magnetic thin film which is not covered by said mask by reactive ion etching with a plasma of a mixed gas of carbon monoxide and a nitrogen-containing compound to form a pattern on said magnetic material thin film and thus obtaining said magnetic material thin film which is finely worked;

wherein said mask material used in said reactive ion etching comprises at least one metal selected from the group consisting of titanium, magnesium, aluminum, germanium, platinum, palladium, an alloy comprising at least one of the foregoing metals as a main component and a compound thereof.

2. A method for reactive ion etching a magnetic material with a plasma of a mixed gas of carbon monoxide and a nitrogen-containing compound, said method comprising:

exposing a multilayer film comprising a magnetic material thin film on a substrate and a resist film on said magnetic material thin film to an electron beam and then developing to form a pattern on said resist film;

vacuum depositing a mask material;

dissolving the resist to form a mask;

removing the part of the magnetic thin film which is not covered by said mask by reactive ion etching with a plasma of a mixed gas of carbon monoxide and a nitrogen-containing compound to form a pattern on said magnetic material thin film and thus obtaining said magnetic material thin film which is finely worked;

wherein said mask material used in said reactive ion etching comprises silicon or an alloy comprising silicon as a main component.

\* \* \* \* \*